(12) United States Patent
Omori et al.

(10) Patent No.: US 8,665,377 B2
(45) Date of Patent: Mar. 4, 2014

(54) VIDEO INFORMATION PROCESSING APPARATUS AND RECORDING MEDIUM HAVING PROGRAM RECORDED THEREIN

(75) Inventors: Nobuhiko Omori, Gyoda (JP); Kazunori Chida, Gunma-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 272 days.

(21) Appl. No.: 12/848,874

(22) Filed: Aug. 2, 2010

(65) Prior Publication Data

US 2011/0187935 A1 Aug. 4, 2011

(30) Foreign Application Priority Data

Aug. 4, 2009 (JP) ................................. 2009-181710

(51) Int. Cl.
*H04N 5/21* (2006.01)
*H04N 5/00* (2011.01)
*G06K 9/40* (2006.01)

(52) U.S. Cl.
USPC ............................ 348/625; 348/607; 382/266

(58) Field of Classification Search
None
See application file for complete search history.

(56) References Cited

U.S. PATENT DOCUMENTS

| | | | | | |
|---|---|---|---|---|---|
| 4,220,972 | A | * | 9/1980 | Geokezas et al. | 348/573 |
| 5,227,863 | A | * | 7/1993 | Bilbrey et al. | 348/578 |
| 5,231,677 | A | * | 7/1993 | Mita et al. | 382/266 |
| 5,550,936 | A | * | 8/1996 | Someya et al. | 382/263 |
| 5,760,922 | A | * | 6/1998 | Kojima | 358/464 |
| 5,870,503 | A | * | 2/1999 | Kumashiro | 382/252 |
| 5,917,955 | A | * | 6/1999 | Kojima | 382/266 |
| 5,920,654 | A | * | 7/1999 | Someya et al. | 382/270 |
| 6,198,841 | B1 | * | 3/2001 | Toyama et al. | 382/164 |
| 7,224,405 | B2 | * | 5/2007 | Taguchi et al. | 348/607 |
| 7,853,095 | B2 | * | 12/2010 | Inada et al. | 382/260 |
| 2002/0015162 | A1 | * | 2/2002 | Hoshii et al. | 358/1.2 |
| 2005/0162620 | A1 | * | 7/2005 | Taguchi et al. | 353/69 |
| 2006/0028541 | A1 | * | 2/2006 | Haraguchi | 348/27 |
| 2006/0061602 | A1 | * | 3/2006 | Schmouker et al. | 345/660 |
| 2006/0132657 | A1 | * | 6/2006 | Lee et al. | 348/625 |
| 2007/0182834 | A1 | * | 8/2007 | Yokoyama et al. | 348/241 |

(Continued)

FOREIGN PATENT DOCUMENTS

| | | |
|---|---|---|
| JP | 06-187441 | 7/1994 |
| JP | 2005-033688 | 2/2005 |

(Continued)

OTHER PUBLICATIONS

Japan Patent Office, Notification of Reasons for Rejection for Application No. 2009-181710, Mail Date Feb. 12, 2013.

*Primary Examiner* — Brian Yenke

(57) ABSTRACT

A video-information-processing apparatus comprising: a smoothing unit to smooth input video information of a plurality of pixels and generate smoothed video information; a subtraction unit to calculate a gradation difference between the input and smoothed video information; a mixing unit to mix the input and smoothed video information at a ratio corresponding to the difference and generate mixed video information; a determination unit to determine whether or not a peripheral pixel region, including each pixel in the input video information and pixels located around the pixel, is a low-frequency region not including a gradation change greater than or equal to a predetermined gradation change; and an output-selection unit to output the mixed video information when the determination unit determines that the peripheral pixel region is the low-frequency region and output the input video information when the determination unit determines that the peripheral pixel region is not the low frequency region.

8 Claims, 10 Drawing Sheets

(56) References Cited

U.S. PATENT DOCUMENTS

| | | | |
|---|---|---|---|
| 2007/0273686 A1* | 11/2007 | Watanabe et al. | 345/419 |
| 2009/0002562 A1* | 1/2009 | Yokoyama et al. | 348/673 |
| 2009/0184916 A1* | 7/2009 | Miyazaki et al. | 345/102 |
| 2009/0285464 A1* | 11/2009 | Urushiya | 382/131 |
| 2009/0317016 A1* | 12/2009 | Cho et al. | 382/264 |
| 2010/0066874 A1* | 3/2010 | Ishiga | 348/252 |
| 2011/0115982 A1* | 5/2011 | Otsuka et al. | 348/625 |

FOREIGN PATENT DOCUMENTS

| | | |
|---|---|---|
| JP | 2007-174403 | 7/2007 |
| JP | 2007-213460 | 8/2007 |
| JP | 2008-199097 | 8/2008 |
| JP | 2009-111559 | 5/2009 |

* cited by examiner

AVERAGE FILTER (3x3)

| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |

FIG. 2A

AVERAGE FILTER (5x5)

| $\frac{1}{25}$ | $\frac{1}{25}$ | $\frac{1}{25}$ | $\frac{1}{25}$ | $\frac{1}{25}$ |
|---|---|---|---|---|
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |

FIG. 2B

| WEIGHTED AVERAGE FILTER (3x3) | | |
|---|---|---|
| $\frac{1}{16}$ | $\frac{2}{16}$ | $\frac{1}{16}$ |
| $\frac{2}{16}$ | $\frac{4}{16}$ | $\frac{2}{16}$ |
| $\frac{1}{16}$ | $\frac{2}{16}$ | $\frac{1}{16}$ |

FIG. 3A

| WEIGHTED AVERAGE FILTER (5x5) | | | | |
|---|---|---|---|---|
| $\frac{1}{256}$ | $\frac{4}{256}$ | $\frac{6}{256}$ | $\frac{4}{256}$ | $\frac{1}{256}$ |
| $\frac{4}{256}$ | $\frac{16}{256}$ | $\frac{24}{256}$ | $\frac{16}{256}$ | $\frac{4}{256}$ |
| $\frac{6}{256}$ | $\frac{24}{256}$ | $\frac{36}{256}$ | $\frac{24}{256}$ | $\frac{6}{256}$ |
| $\frac{4}{256}$ | $\frac{16}{256}$ | $\frac{24}{256}$ | $\frac{16}{256}$ | $\frac{4}{256}$ |
| $\frac{1}{256}$ | $\frac{4}{256}$ | $\frac{6}{256}$ | $\frac{4}{256}$ | $\frac{1}{256}$ |

FIG. 3B

SHARPENING FILTER 1 (3x3)

| 0 | -1 | 0 |
|---|----|----|
| -1 | 5 | -1 |
| 0 | -1 | 0 |

FIG. 6

SHARPENING FILTER 2 (3x3)

| -1 | -1 | -1 |
|----|----|----|
| -1 | 9 | -1 |
| -1 | -1 | -1 |

VIDEO INFORMATION PROCESSING APPARATUS AND RECORDING MEDIUM HAVING PROGRAM RECORDED THEREIN

CROSS-REFERENCE TO RELATED APPLICATION

This application claims the benefit of priority to Japanese Patent Application No. 2009-181710, filed Aug. 4, 2009, of which full contents are incorporated herein by reference.

BACKGROUND OF THE INVENTION

1. Field of the Invention

The present invention relates to a video information processing apparatus and a recording medium having a program recorded therein.

2. Description of the Related Art

Recently, digital TV broadcasting capable of multi-channel and high-definition broadcasting has been started in many countries, and some countries provide broadcasting for mobile units such as cellular phones. For example, in the digital terrestrial television broadcasting in Japan employing ISDB-T (Integrated Services Digital Broadcasting-Terrestrial), one-segment broadcasting (one-segment partial reception service for cellular phones and mobile terminals) is provided using one segment in 13 segments obtained by dividing each channel. As other digital TV broadcastings for mobile units, the DVB-H (Digital Video Broadcasting-Handheld), the T-DMB (Terrestrial-Digital Multimedia Broadcasting) and the like are known.

The digital TV broadcasting for mobile units as above is viewed using a cellular phone and can be also viewed by using a car navigation system and a small-sized TV set installed in a bath room or the like. The digital TV broadcasting can also be viewed by connecting a reception unit (tuner) to a TV set for analog broadcasting, a personal computer or the like. For example, Japanese Patent Laid-Open Publication No. 2009-111559 discloses a one-segment video display method/device that realizes viewing on a larger display screen using a tuner for one-segment broadcasting mounted on a cellular phone and the like.

As mentioned above, not only a small display screen on a cellular phone or the like but also a larger display screen can be used to view the digital TV broadcasting for mobile units.

However, in the digital TV broadcasting for mobile units as above, a video compression technique such as H.246/MPEG-4 AVC is used, and an information bit rate is lower than that for usual digital TV broadcasting for stationary reception.

Therefore, gradation on the sky, human skin, or the like cannot be smoothly depicted and the gradation coarsely depicted. Such coarse gradation is apparent especially when video information is enlarged (scaling-up) using pixel conversion or the like and viewed on a larger display screen. If edge enhancement processing is performed for the purpose of preventing contours from blurring by scaling-up, the coarse gradation is further enhanced.

SUMMARY OF THE INVENTION

A video information processing apparatus according to an aspect of the present invention, comprises: a smoothing unit configured to smooth input video information of a plurality of pixels and generate smoothed video information; a subtraction unit configured to calculate a gradation difference between the input video information and the smoothed video information; a mixing unit configured to mix the input video information and the smoothed video information at a ratio corresponding to the gradation difference and generate mixed video information; a determination unit configured to determine whether or not a peripheral pixel region, including each pixel in the input video information and pixels located around the pixel, is a low frequency region not including a gradation change greater than or equal to a predetermined gradation change; and an output selection unit configured to output the mixed video information when the determination unit determines that the peripheral pixel region is the low frequency region and output the input video information when the determination unit determines that the peripheral pixel region is not the low frequency region.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 2A is a diagram illustrating an average filter (moving average filter) having a size of 3×3 (three rows by three columns) to be used as an example in a smoothing unit 1;

FIG. 2B is a diagram illustrating an average filter (moving average filter) having a size of 5×5 (five rows by five columns) to be used as an example in a smoothing unit 1;

FIG. 3A is a diagram illustrating a weighted average filter (Gaussian filter) having a size of 3×3 (three rows by three columns) to be used as an example in a smoothing unit 1;

FIG. 3B is a diagram illustrating a weighted average filter (Gaussian filter) having a size of 5×5 (five rows by five columns) to be used as an example in a smoothing unit 1;

FIG. 6 is a diagram illustrating an example of a sharpening filter to be used in an edge enhancement unit 6;

FIG. 7 is a diagram illustrating another example of a sharpening filter to be used in an edge enhancement unit 6;

DETAILED DESCRIPTION OF THE INVENTION

At least the following details will become apparent from descriptions of this specification and of the accompanying drawings.

<First Embodiment>
==Configuration of Video Information Processing Apparatus==

A configuration of a video information processing apparatus according to a first embodiment of the present invention will hereinafter be described referring to FIG. 1.

Figure 1:
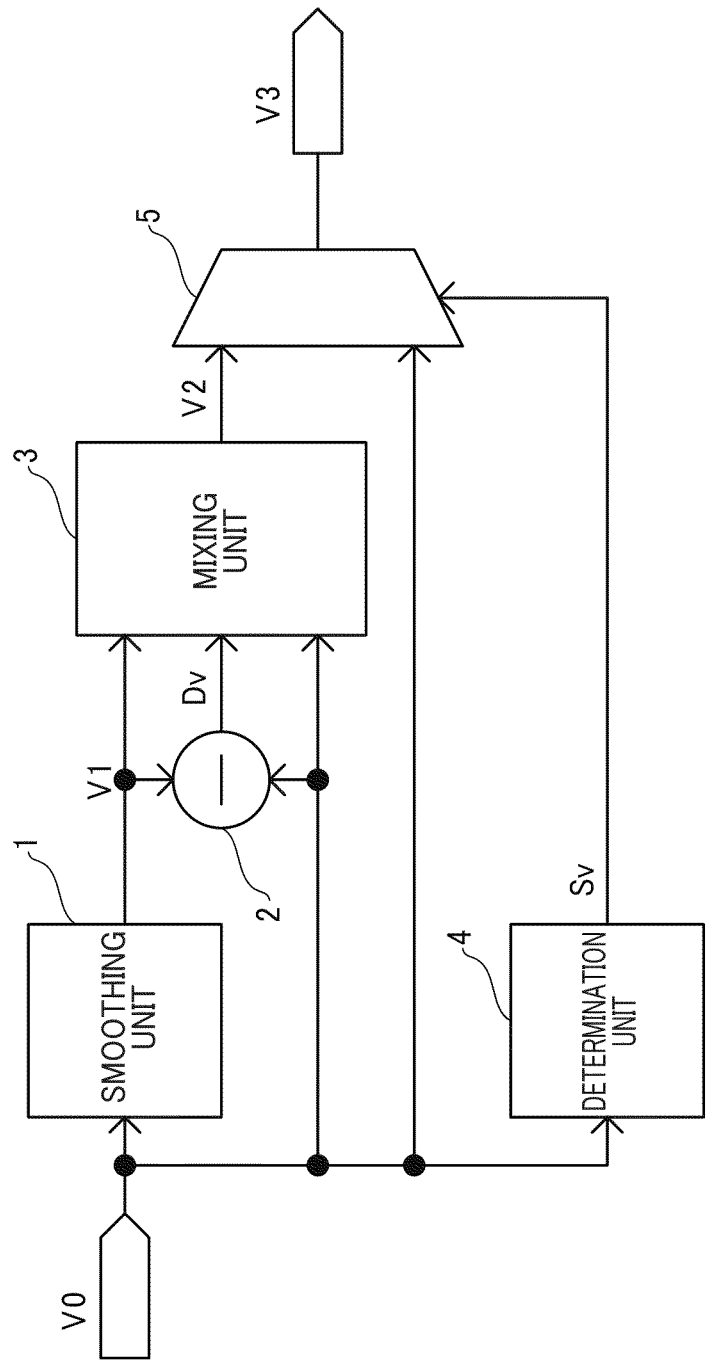
FIG. 1 is a block diagram illustrating a configuration of a video information processing apparatus according to a first embodiment of the present invention.

The video information processing apparatus shown in FIG. 1 includes a smoothing unit 1, a subtraction unit 2, a mixing unit 3, a determination unit 4, and an output selection unit (multiplexer) 5. Input video information V0 obtained by scaling up video information of one-segment broadcasting, for example, is inputted to the video information processor.

The input video information V0 is inputted to the smoothing unit 1, and smoothed video information V1 is outputted from the smoothing unit 1. The input video information V0 and the smoothed video information V1 are inputted to the subtraction unit 2, and a gradation difference Dv is outputted from the subtraction unit 2. Further, the input video information V0, the smoothed video information V1, and the gradation difference Dv are inputted to the mixing unit 3, and mixed video information V2 is outputted from the mixing unit 3. The input video information V0 is inputted to the determination unit 4, and a determination result Sv is outputted from the determination unit 4. The input video information V0 and the mixed video information V2 are inputted to a data input of the output selection unit 5, and the determination result Sv is inputted to a selection control input. Output video information V3 is outputted from the output selection unit 5.

==Operation of Video Information Processing Apparatus==

Subsequently, an operation of the video information processing apparatus in an embodiment of the present invention will be described.

The video information, which is inputted to each of the units or outputted from each of the units of the video information processing apparatus, is constituted by a plurality of pixels arranged in a matrix state with M rows and N columns, for example. In the following description, the location of each pixel in the video information is represented as P (m, n) ($1 \leq m \leq M$, $1 \leq n \leq N$). Also, an element at each pixel location P (gradation value of the pixel, etc.) is expressed with (P) or (m, n). For example, the gradation value at each pixel location P in the input video information V0 is represented as V0 (P) or V0 (m, n).

The smoothing unit 1 smoothes the input video information V0 and generates the smoothed video information V1. A coarse gradation portion, such as the sky and human skin included in the input video information V0, is smoothed by the smoothing processing.

The smoothed video information V1 can be generated using an average filter (moving average filter) as shown in FIGS. 2A and 2B, for example. Here, when the average filter is used, which has a size of 3×3 (three rows by three columns) shown in FIG. 2A, assuming that the location of the pixel at the center of the filter (center pixel) is P, a gradation value V1 (P) at each center pixel location P of the smoothed video information V1 is expressed as follows:

$$V1(P) = [V0(m-1, n-1) + V0(m-1, n) + V0(m-1, n+1) + V0(m, n-1) + V0(m, n) + V0(m, n+1) + V0(m+1, n-1) + V0(m+1, n) + V0(m+-1, n+1)]/9$$

That is, the gradation value V1(P) becomes a moving average of gradation values in a local region having a size of 3×3, with the pixel location P of the input video information V0 as the center, and weights assigned to the nine pixels each are ⅑ and the weights are all equal. Similarly, when the average filter is used, which has a size of 5×5 (five rows by five columns) shown in FIG. 2B, the gradation value V1(P) becomes a moving average of gradation values in a local region having a size of 5×5, with the pixel location P of the input video information V0 at the center, and weights assigned to the 25 pixels each are 1/25 and the weights are all equal.

The smoothed video information V1 can also be generated using a weighted average filter as shown in FIGS. 3A and 3B, for example. As shown in FIGS. 3A and 3B, in the weighted average filter, weights vary with the pixels and the gradation value V1(P), to which the weights are assigned, becomes a moving average of the gradation values in the local region, with the pixel location P of the input video information V0 as the center. The weighted average filters shown in FIGS. 3A and 3B are Gaussian filters, in which weighting is in accordance with a Gaussian function of a distance from the center pixel location P.

The subtraction unit 2 calculates the gradation difference Dv(>0) between the input video information V0 and the smoothed video information V1. The gradation difference Dv(P) at each pixel location P can be expressed as follows:

$$Dv(P) = |V1(P) - V0(P)|$$

The mixing unit 3 mixes the input video information V0 and the smoothed video information V1 at a ratio corresponding to the gradation difference Dv, and generates the mixed video information V2. Assuming that the ratio of the smoothed video information V1 in the mixing processing is a mixing ratio R, a gradation value V2(P) at each pixel location P of the mixed video information V2 can be expressed as follows:

$$V2(P) = V1(P) \times R(P) + V0(P) \times [1 - R(P)]$$

Figure 4:
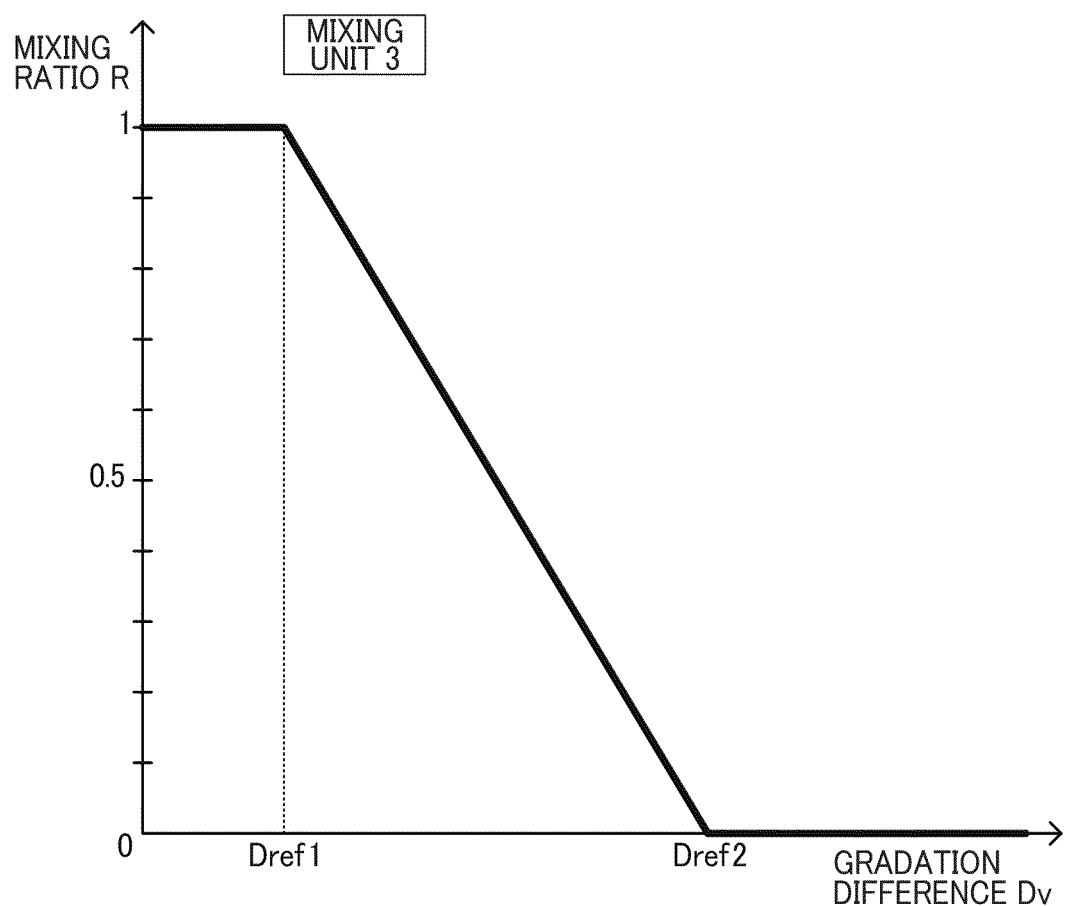
FIG. 4 is a schematic diagram illustrating an example of a relationship between a gradation difference and a mixing ratio in a mixing unit 3.

Here, an example of the relationship between the gradation difference Dv and the mixing ratio R in the mixing unit 3 is shown in FIG. 4. In the case of Dv<Dref1 (first reference value), the mixing unit 3 performs mixing so as to obtain R=1, that is, so that the ratios of the input video information V0 and the smoothed video information V1 are 0% and 100%, respectively, and generates the mixed video information V2. In the case of Dv≥Dref2(second reference value)>Dref1, the mixing unit 3 performs mixing so as to obtain R=0, that is, so that the ratios of the input video information V0 and the smoothed video information V1 are 100% and 0%, respectively, and generates the mixed video information V2. In the case of Dref1≤Dv<Dref2, the mixing ratio R varies substantially linearly.

As mentioned above, the smoothing unit 1 smoothes a coarse gradation portion included in the input video information V0, but in order to smooth a broad gradation portion such as the sky, it is preferable that the average filter or the weighted average filter is increased in size. However, the smoothing unit 1 performs the smoothing processing uniformly for the entire input video information V0, and thus if a large sized filter is used, information of details (detail) of a portion other than the gradation portion is lost. Therefore, with respect to the mixed video information V2, in the details in which the gradation difference Dv is relatively greater, the ratio of the smoothed video information V1 (mixing ratio R) becomes smaller. As mentioned above, the mixing unit 3 generates the mixed video information V2 in which the coarse gradation portion is smoothed while information of the details is maintained.

The determination unit 4 determines whether or not a peripheral pixel region, including each pixel of the input video information V0 and pixels located around the pixel, is a low-frequency region not including the gradation change greater than or equal to the predetermined gradation change. That is, the determination unit 4 determines whether or not a peripheral pixel region, where each pixel in the input video information V0 is located and pixels around the pixel are located, is a low frequency region where the gradation change greater than or equal to the predetermined gradation change is not made. For example, a difference (>0) in gradation value between a pixel to be determined (target pixel) and each of eight pixels adjacent to the target pixel (adjacent pixels) is calculated, and when all the differences are smaller than a set threshold value, it is determined that the peripheral pixel region including the target pixel and the adjacent pixels is a low frequency region. Alternatively, for example, when a difference between the maximum value and the minimum value of the gradation values of the peripheral pixel region is smaller than the threshold value, it may be determined that the region is the low frequency region. It is assumed that the determination result Sv(P) at each pixel location P becomes Sv(P)=L when the determination unit 4 determines that the peripheral pixel region is the low frequency region and it becomes Sv(P)=H when the determination unit 4 determines that the pixel region is not the low frequency region.

The output selection unit 5 selects either one of the input video information V0 and the mixed video information V2 in accordance with the determination result Sv of the determination unit 4, and generates output video information V3. More specifically, a gradation value V3(P) at each pixel location P of the output video information V3 becomes V3(P)=V2(P) in the case of Sv(P)=L, and the gradation value V3(P) becomes V3(P)=V0(P) in the case of Sv(P)=H.

As mentioned above, the video information processing apparatus according to an embodiment of the present invention selects either one of the input video information V0 and the mixed video information V2 in accordance with the determination result Sv on whether or not the peripheral pixel region of the input video information V0 is the low frequency region, and outputs such selected information. When the peripheral pixel region is not the low frequency region, the peripheral pixel region includes the gradation change greater than or equal to the predetermined gradation change and is not the gradation portion, and thus the video information processing apparatus outputs the gradation value of the input video information V0 as it is. On the other hand, when the peripheral pixel region is the low frequency region, the video information processing apparatus outputs the gradation value of the mixed video information V2 in which the coarse gradation portion thereof is smoothed while the information of the details thereof is maintained. Therefore, only the coarse gradation included in the input video information V0 is selectively smoothed, thereby being able to improve image quality.

<Second Embodiment>
==Configuration of Video Information Processing Apparatus==

A configuration of a video information processing apparatus according to a second embodiment of the present invention will hereinafter be described referring to FIG. 5.

Figure 5:
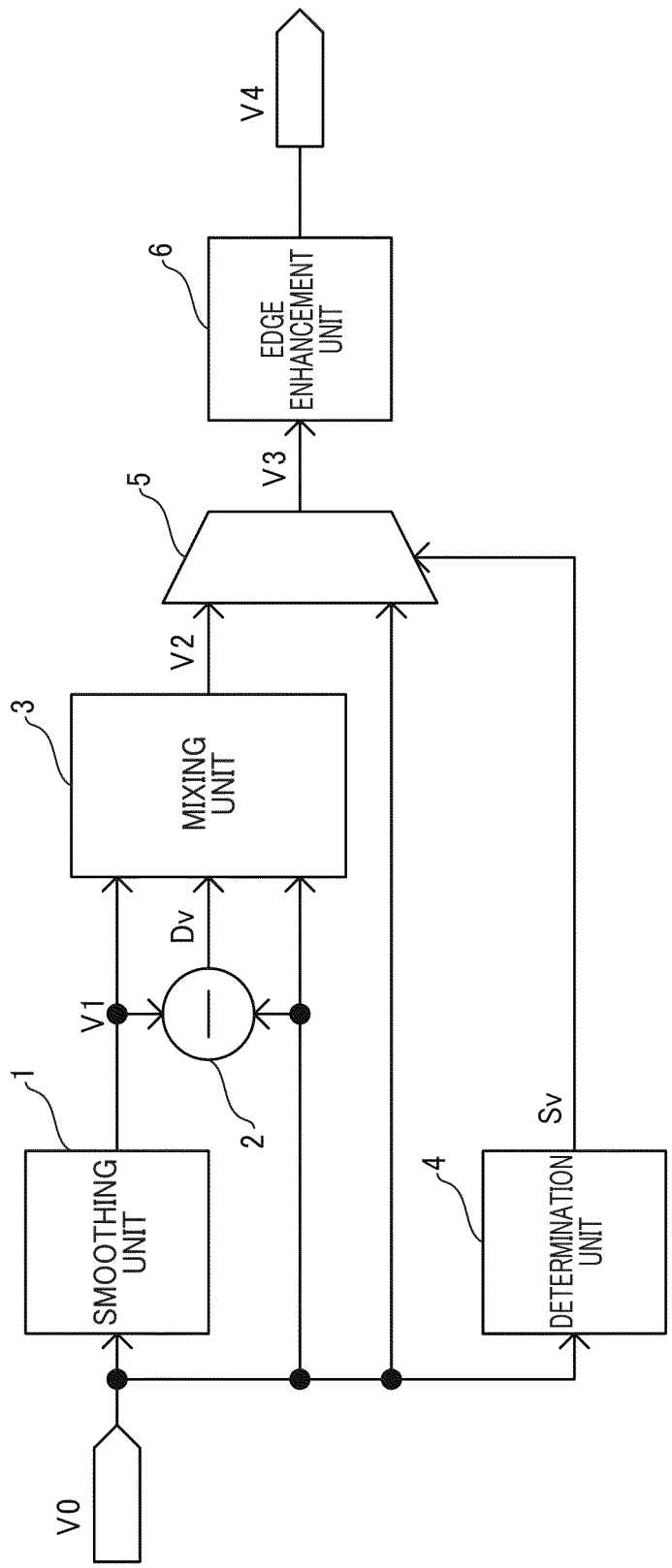
FIG. 5 is a block diagram illustrating a configuration of a video information processing apparatus according to a second embodiment of the present invention.

The video information processing apparatus shown in FIG. 5 further includes an edge enhancement unit 6 in addition to the configuration of the video information processing apparatus according to a first embodiment of the present invention. The output video information V3 of the output selection unit 5 is inputted to the edge enhancement unit 6, and output video information V4 is outputted from the edge enhancement unit 6.

==Operation of Video Information Processing Apparatus==

Subsequently, an operation of the video information processing apparatus according to an embodiment of the present invention will be described.

The operation of the video information processing apparatus according to an embodiment of the present invention is the same as the operation of the video information processing apparatus according to a first embodiment of the present invention except the operation of the edge enhancement unit 6.

The edge enhancement unit 6 enhances an edge of the output video information V3 of the output selection unit 5, and generates the output video information V4. When the video information particularly scaled-up by edge enhancement processing is inputted as the input video information V0, blurred contours become clear.

For example, the output video information V4 can be generated using a sharpening filter as shown in FIG. 6. The sharpening filter shown in FIG. 6 subtracts, from the inputted output video information V3, an output of a Laplacian filter having a size of 3×3 on the basis of quadratic differential in the row direction and the column direction, and the gradation value V4(P) at each center pixel location P of the output video information V4 is expressed as follows:

$$V4(P) = 5 \times V3(m, n) - [V3(m, n-1) + V3(m, n+1) + V3(m-1, n) + V3(m+1, n)]$$

Also, the output video information V4 can be generated using a sharpening filter as shown in FIG. 7. The sharpening filter shown in FIG. 7 subtracts, from the inputted output video information V3, an output of a Laplacian filter having a size of 3×3 on the basis of quadratic differential in the row direction, the column direction, and a diagonal direction, and the gradation value V4(P) at each center pixel location P of the output video information V4 is expressed as follows:

$$V4(P) = 9 \times V3(m, n) - [V3(m, n-1) + V3(m, n+1) + V3(m-1, n) + V3(m+1, n)] + V3(m-1, n-1) + V3(m+1, n+1) + V3(m-1, n+1) + V3(m+1, n-1)]$$

==Specific Example of Operation of Video Information Processing Apparatus==

A specific example of an operation of the video information processing apparatus will hereinafter be described referring to FIGS. 8 to 13.

Figure 8:
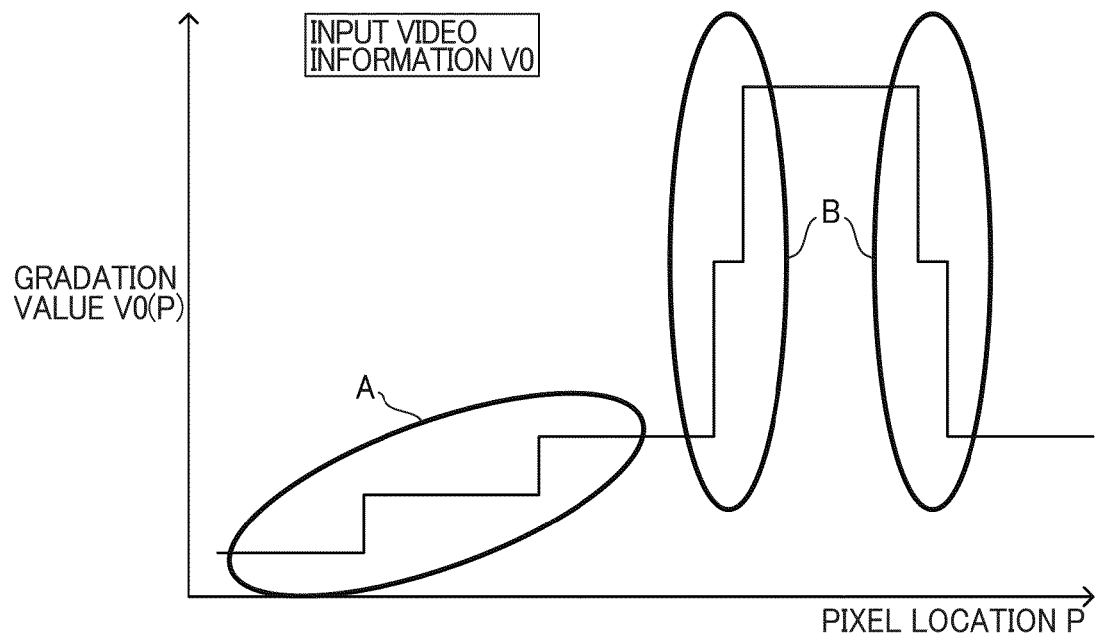
FIG. 8 is a schematic diagram illustrating an example of a relationship between a pixel location and a gradation value of input video information V0.

FIG. 8 shows an example of the input video information V0, in which the horizontal axis indicates displacement of the pixel location P on a plane and the vertical axis indicates the gradation value Vo(P) at each pixel location P, respectively.

In FIG. 8, a region A indicates a coarse gradation portion, and since a change in gradation value V0(P) is small, the determination unit 4 determines that the region is the low frequency region. On the other hand, a region B indicates an edge portion, and since the change in gradation value V0(P) is great, the determination unit 4 determines that the region is not the low frequency region.

Figure 9:
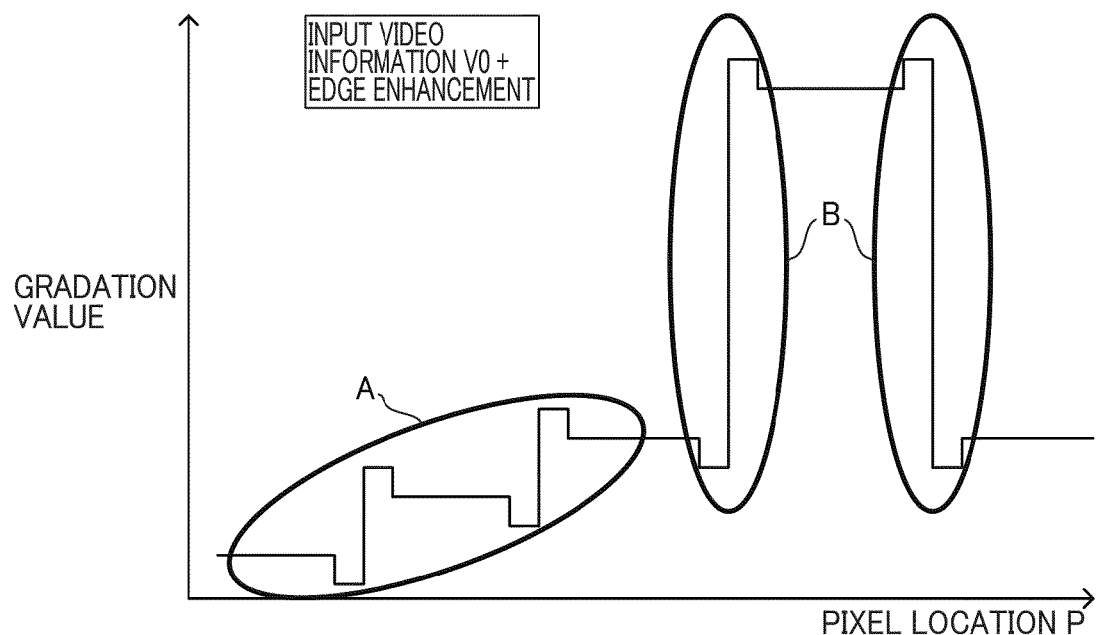
FIG. 9 is a schematic diagram illustrating an example of a relationship between a pixel location and a gradation value when edge enhancement processing is performed for input video information V0.

Here, when the edge enhancement processing is directly performed for the input video information V0, in the region B which is the edge portion, the change in gradation value is enhanced as shown in FIG. 9. However, the gradation of the region A is not smoothly depicted, and thus the change in gradation value of the region A is also enhanced by the edge enhancement processing.

Figure 10:
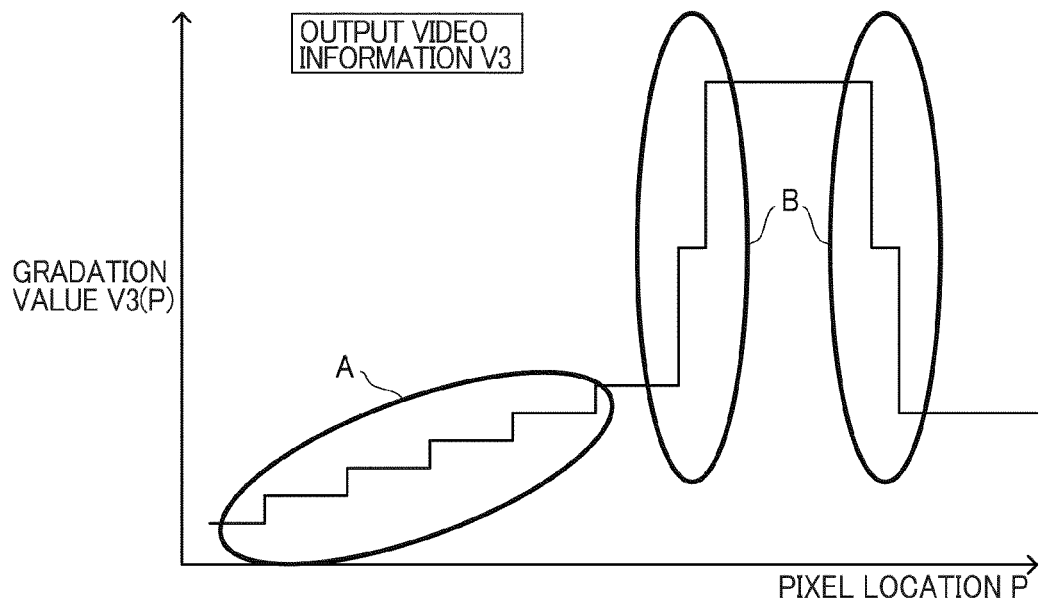
FIG. 10 is a schematic diagram illustrating an example of a relationship between a pixel location and a gradation value of output video information V3.

On the other hand, with respect to the output video information V3 of the output selection unit 5, as shown in FIG. 10, the gradation value of the mixed video information V2 obtained by smoothing the coarse gradation portion is outputted to the region A which is determined as the low frequency region. Also, the gradation value of the input video information V0 is outputted, as it is, to the region B which is not determined as the low frequency region.

Figure 11:
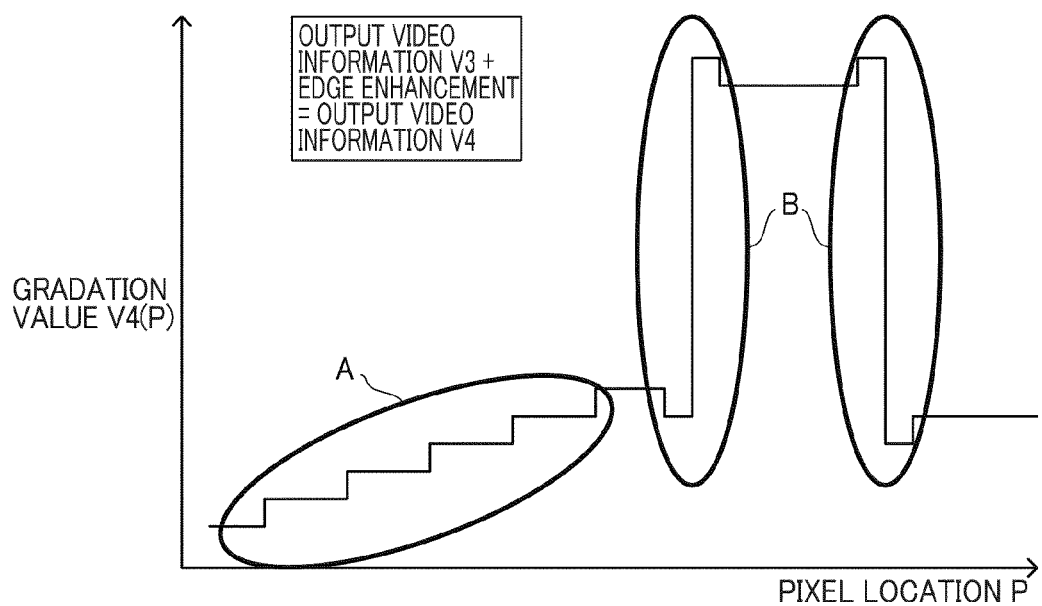
FIG. 11 is a schematic diagram illustrating an example of a relationship between a pixel location and a gradation value of output video information V4.

Therefore, in the output video information V4 obtained by performing the edge enhancement processing to the output video information V3, as shown in FIG. 11, the gradation of the region A is smoothly depicted, and the edge of the region B is enhanced.

Figure 12:
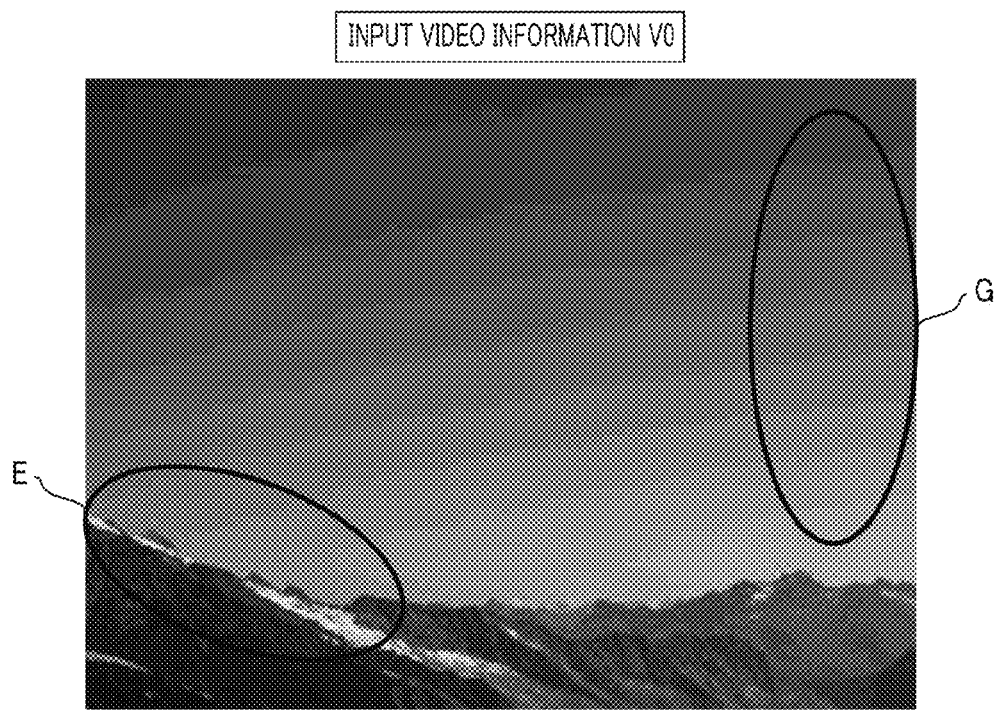
FIG. 12 illustrates an example of an image displayed by input image information V0.
Figure 13:
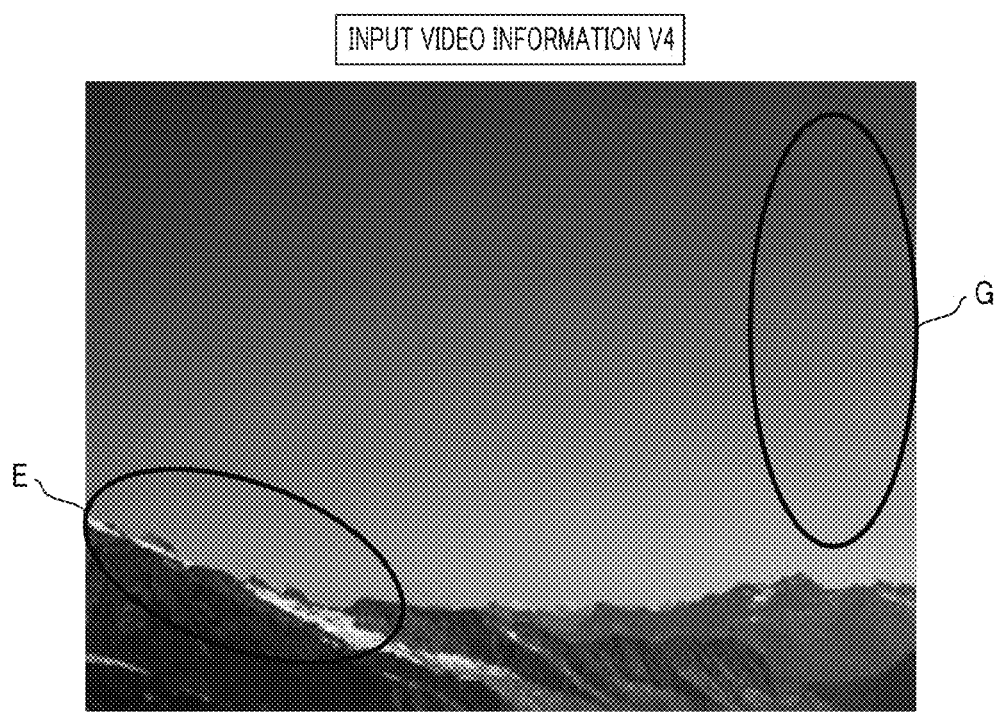
FIG. 13 illustrates an example of an image displayed by output image information V4.

As mentioned above, the video information processing apparatus according to an embodiment of the present invention selectively smoothes only the coarse gradation included in the input video information V0, and makes clear the contours blurred by scaling-up, thereby being able to improve the image quality. As an example, the video information processing apparatus according to an embodiment of the present invention outputs the output video information V4 as shown in FIG. 13 for the input video information V0 as shown in FIG. 12. A region G in which the gradation of the sky is depicted is coarsely depicted in the input video information V0, but is smoothly depicted in the output video information V4. On the other hand, a region E in which a mountain ridge line is depicted is subjected to the edge enhancement processing without losing information of the details by the smoothing processing.

==Operation of Program==

Figure 14:
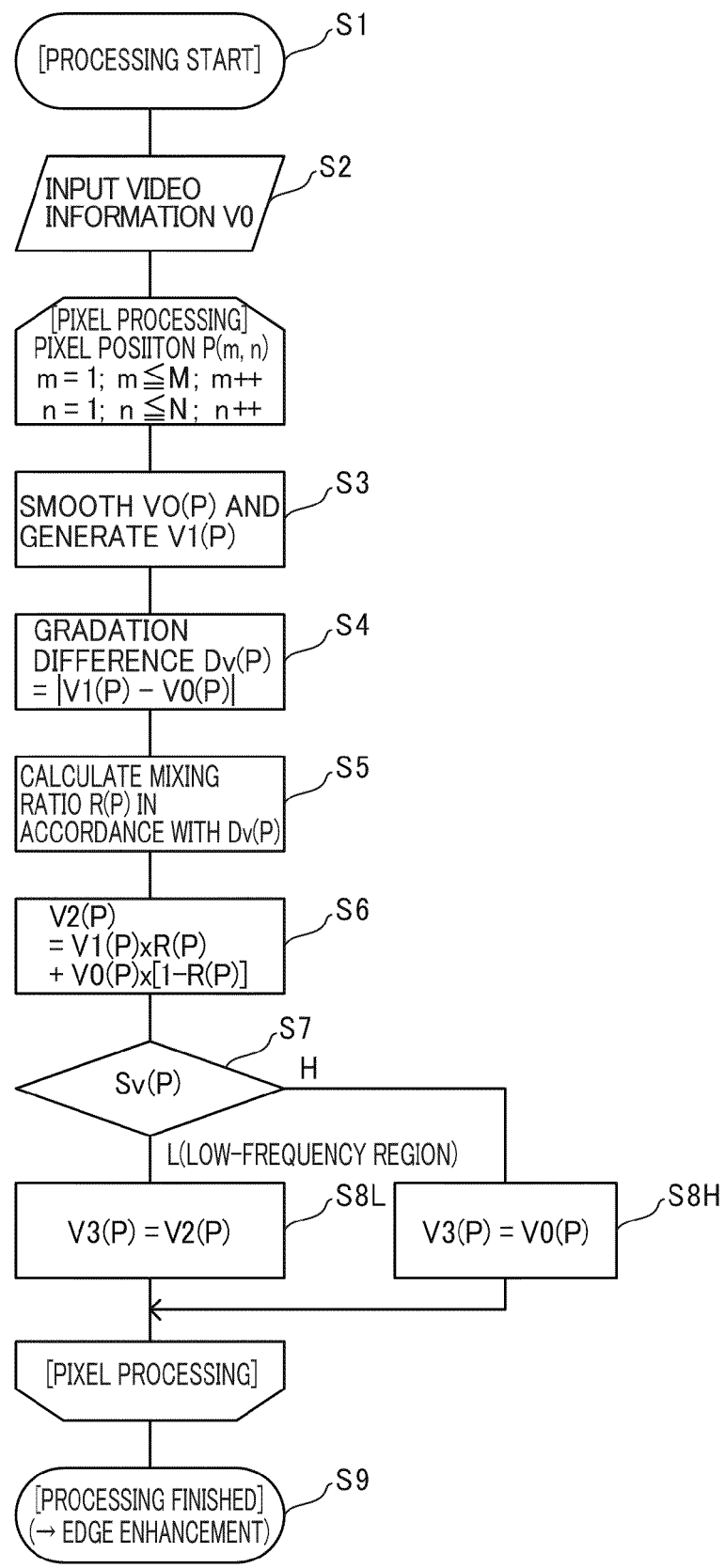
FIG. 14 is a flowchart for explaining an operation of a program causing a computer to perform functions of the smoothing unit 1, a subtraction unit 2, a mixing unit 3, a determination unit 4, and an output selection unit 5.

Functions of the units in the video information processing apparatus according to embodiments of the present invention can be also realized using a computer. An operation of a program that causes the computer to perform the functions corresponding to the units of the video information processing apparatus will hereinafter be described referring to FIG. 14.

When processing of the program is started (S1), first, the input video information V0 is inputted (S2), and thereafter, processing from S3 to S8L or S8H is performed for each pixel location P(m, n) (loop processing).

In the loop processing, first, the input video information V0(P) is smoothed using the average filter or the like, so as to generate the smoothed video information V1(P) (S3).

Subsequently, the gradation difference Dv(P) between the input video information Vo(P) and the smoothed video information V1(P) is calculated (S4).

Further subsequently, as shown in FIG. 4, for example, the mixing ratio R(P) is calculated in accordance with the gradation difference Dv(P) (S5).

Still further subsequently, the input video information V0(P) and the smoothed video information V1(P) are mixed at the mixing ratio R(P), to generate the mixed video information V2(P) (S6).

Still further subsequently, by the above-mentioned method, it is determined whether or not the peripheral pixel region of the pixel location P is the low frequency region (S7).

In S7, when it is determined that the peripheral pixel region is the low frequency region (S7:L), the mixed video information V2(P) is outputted as the output video information V3(P) (S8L). On the other hand, in S7, when it is determined that the peripheral pixel region is not the low frequency region (S7:H), the input video information V0(P) is outputted as the output video information V3(P) (S8H).

By performing the loop processing from S3 to S8L or S8H for each pixel location P, the entire output video information V3 is generated, and the processing is finished (S9). The above processing is performed every time the input video information V0 is inputted, such as frame by frame. Also, as in the video information processing apparatus according to a second embodiment of the present invention, the edge enhancement processing may be performed for the generated output video information V3.

As mentioned above, the input video information V0 and the smoothed video information V1 are mixed at a ratio corresponding to the gradation difference Dv, so as to generate the mixed video information V2, either one of the input video information V0 and the mixed video information V2 is selected in accordance with the determination result Sv on whether or not the peripheral pixel region of the input video information V0 is the low frequency region, and the output video information V3 is generated, so that only the coarse gradation included in the input video information V0 is selectively smoothed, thereby being able to improve the image quality.

Further the edge of the output video information V3 is enhanced, to generate the output video information V4, and thus only the coarse gradation included in the input video information V0 is selectively smoothed, so that the contours become clear thereby being able to improve the image quality.

Still further, the mixed video information V2 is generated such that the ratio of the smoothed video information V1 becomes smaller as the gradation difference Dv becomes greater, and thus the mixed video information V2 can be generated in which the coarse gradation portion is smoothed while the information of the details is maintained.

Still further, the input video information V0 obtained by scaling-up the video information of the one-segment broadcasting is inputted to the video information processing apparatus, and thus the gradation which has been coarsely depicted due to the video compression technique can be smoothed or the contours blurred by the scaling-up can become clear.

Still further, in the program that causes the computer to perform the functions corresponding to the units of the video information processing apparatus, such loop processing is performed for each pixel location P that the input video information V0(P) and the smoothed video information V1(P) are mixed at the mixing ratio R(P), so as to generate the mixed video information V2(P), and that either one of the input video information V0(P) and the mixed video information V2(P) is outputted as the output video information V3(P) in accordance with the determination result Sv(P) on whether or not the peripheral pixel region of the pixel location P is the low frequency region, and thus, only the coarse gradation included in the input video information V0 can be selectively smoothed, thereby being able to improve the image quality.

In embodiments of the present invention as described above, there was described the case of the video information of the one-segment broadcasting as an example of the input video information V0, but it is not limited thereto. The video information processing apparatus and the program according to an embodiment of the present invention can be widely applied to the compressed digital video information, in which smooth depiction of the gradation is difficult. For example, an embodiment of the present invention can also be applied to the video information, such as the digital TV broadcasting for mobile units in other formats and the video delivery services through the Internet.

In embodiments of the present invention as described above, the smoothing unit 1 generates the smoothed video information V1 using the average filter and the weighted average filter, but it is not limited thereto. For example, a high frequency component in spatial frequency components obtained by performing two-dimensional FFT (Fast Fourier Transform) for the input video information V0 is reduced and the two-dimensional IFFT (Inverse FFT) is performed therefor, so that the smoothed video information V1 can also be generated. In this case, the smoothing unit 1 functions as an LPF (Low-Pass Filter), which relatively enhances a low spatial frequency component.

In a second embodiment of the present invention, the edge enhancement unit 6 generates the output video information V4 using the sharpening filter, but it is not limited thereto. For example, the low frequency component in the spatial frequency components obtained by performing the two-dimensional FFT for the inputted output video information V3 is reduced and the two-dimensional IFFT is performed therefor, so that the output video information V4 can also be generated. In this case, the edge enhancement unit 6 functions as an HPF (High-Pass Filter), which relatively enhances the high spatial frequency component.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A video information processing apparatus comprising:
a smoothing unit to which input video information of a plurality of pixels is directly inputted, the smoothing unit configured to smooth the input video information and generate smoothed video information;
a subtraction unit to which the input video information and the smoothed video information are directly inputted, the subtraction unit configured to calculate a gradation difference between the input video information and the smoothed video information;
a mixing unit to which the input video information, the smoothed video information and the gradation difference are directly inputted, the mixing unit configured to mix the input video information and the smoothed video information at a ratio corresponding to the gradation difference and generate mixed video information;
a determination unit to which the input video information is directly inputted, the determination unit configured to determine whether or not a peripheral pixel region, including each pixel in the input video information and pixels located around the pixel, is a low frequency region not including a gradation change greater than or equal to a predetermined gradation change; and
an output selection unit to which the input video information, the mixed video information and a determination result of the determination unit are directly inputted, the output selection unit configured to
output the mixed video information when the determination unit determines that the peripheral pixel region is the low frequency region and
output the input video information when the determination unit determines that the peripheral pixel region is not the low frequency region.

2. The video information processing apparatus according to claim 1, further comprising
an edge enhancement unit configured to enhance an edge of video information outputted from the output selection unit and output the video information with the enhanced edge.

3. The video information processing apparatus according to claim 1, wherein
the mixing unit generates the mixed video information so that ratios of the input video information and the smoothed video information become 0% and 100%, respectively, when the gradation difference has a value smaller than a first reference value, wherein
the mixing unit generates the mixed video information so that the ratios of the input video information and the smoothed video information become 100% and 0%, respectively, when the gradation difference has a value greater than or equal to a second reference value which is greater than the first reference value, and wherein
a mixing ratio between the input video information and the smoothed video information varies substantially linearly, when the gradation difference has a value greater than or equal to the first reference value and smaller than the second reference value.

4. The video information processing apparatus according to claim 2, wherein
the mixing unit generates the mixed video information so that ratios of the input video information and the smoothed video information become 0% and 100%, respectively, when the gradation difference has a value smaller than a first reference value, wherein
the mixing unit generates the mixed video information so that the ratios of the input video information and the smoothed video information become 100% and 0%, respectively, when the gradation difference has a value greater than or equal to a second reference value which is greater than the first reference value, and wherein
a mixing ratio between the input video information and the smoothed video information varies substantially linearly, when the gradation difference has a value greater than or equal to the first reference value and smaller than the second reference value.

5. The video information processing apparatus according to claim 1, wherein
the input video information is video information obtained by enlarging video information of digital TV broadcasting for a mobile unit.

6. The video information processing apparatus according to claim 2, wherein
the input video information is video information obtained by enlarging video information of digital TV broadcasting for a mobile unit.

7. The video information processing apparatus according to claim 3, wherein
the input video information is video information obtained by enlarging video information of digital TV broadcasting for a mobile unit.

8. The video information processing apparatus according to claim 4, wherein
the input video information is video information obtained by enlarging video information of digital TV broadcasting for a mobile unit.

* * * * *